(12) United States Patent
Thurber, Jr.

(10) Patent No.: US 6,169,444 B1
(45) Date of Patent: Jan. 2, 2001

(54) PULSE FREQUENCY OPERATION OF REGULATED CHARGE PUMPS

(75) Inventor: Charles R. Thurber, Jr., Sunnyvale, CA (US)

(73) Assignee: MAXIM Integrated Products, Inc., Sunnyvale, CA (US)

(*) Notice: Under 35 U.S.C. 154(b), the term of this patent shall be extended for 0 days.

(21) Appl. No.: 09/354,924

(22) Filed: Jul. 15, 1999

(51) Int. Cl.[7] ............................................. G05F 1/10
(52) U.S. Cl. ............................ 327/536; 327/540; 363/60
(58) Field of Search .................................... 327/536, 538, 327/540, 541, 543, 537; 363/60

(56) References Cited

U.S. PATENT DOCUMENTS

| | | | |
|---|---|---|---|
| 6,040,736 | * | 3/2000 | Milanesi et al. ...................... 327/540 |
| 6,052,022 | * | 4/2000 | Lee ....................................... 327/536 |

OTHER PUBLICATIONS

Dual–Output Power–Supply Controller for Notebook Computers; Data Sheets for MAX786; Rev. 2; Apr. 97; Maxim Integrated Products.
Switched–Capacitor Voltage Doublers; Data Sheets for MAX1682/MAX1683; Rev. 1; Aug. 98; Maxim Integrated Products.
Regulated, 125mA–Output, Charge–Pump DC–DC Inverter; Data Sheets for MAX1673; Rev. 0; Jan. 98; Maxim Integrated Products.
3.3V–Input to Regulated 5V–Output Charge Pumps; Data Sheets for MAX682/MAX683/MAX684; Rev. 1; Aug. 1998; Maxim Integrated Products.

* cited by examiner

*Primary Examiner*—Jung Ho Kim
(74) *Attorney, Agent, or Firm*—Hickman Coleman & Hughes LLP

(57) ABSTRACT

A regulating system (10) for a charge pump (12) employing a detection sub-circuit (28) and an enable sub-circuit (30) to operate an oscillator (26) and a channel-switching sub-circuit (32) in an automatic manner producing many of the advantages of previously unreconcilable skip mode and constant frequency mode type regulation. The detection sub-circuit (28) compares a feedback signal (52) from the output terminal (18) of the charge pump (12) to a reference signal (56) and produces an error signal (42) representative of output voltage deviation. Concurrently, the enable sub-circuit (30) compares a threshold signal (72) set for a minimum energy quanta which it is efficient for the flying capacitor (24) of the charge pump (12) to transfer to the error signal (42) and produces an enable signal (38) to enable the oscillator (26). An oscillator signal (40) then controls switching within the channel-switching sub-circuit (32) to set when the energy quanta are transferred and the error signal (42) further is used to control resistance in the charge path to the flying capacitor (24) to set the magnitude of the quanta.

20 Claims, 5 Drawing Sheets

PULSE FREQUENCY OPERATION OF REGULATED CHARGE PUMPS

TECHNICAL FIELD

The present invention relates generally to electronic circuits for conversion of direct current power, and more particularly to systems for regulating high-efficiency charge pump circuits.

BACKGROUND ART

Electronic circuits today often require power in one or more specific direct current (DC) voltage ranges. Supplying such, however, can pose a number of problems. If only one supply voltage is needed, it may not be of a value easily obtainable from available sources, like standard battery cells. Source-requirements mating can therefore be one problem encountered, and source voltage conversion may thus be desirable or necessary. A source also may not supply voltage which is consistently in a desired range. Batteries again provide a good example. Battery voltage varies with load, charge, temperature, etc. Such source voltage variation therefore can also be a problem, and source voltage regulation may thus also be desirable or necessary. Of course, when multiple supply voltages are needed, such power source problems increase accordingly.

For many electronic circuits it is particularly desirable to use only one power source, and to increase, decrease, or invert the voltage from it, and to also regulate the power from it for all needs. This is the case for portable electronic devices, such as cellular telephones, personal digital assistants, global position sensors etc. But even for non portable devices this is often desirable, since it permits construction of circuits which are smaller, more reliable, cheaper, etc.

Various power conversion and regulation systems currently exist. Of present interest is the charge pump. It is one of the most widely used such systems today. A charge pump is a capacitor and oscillator based circuit which converts a DC input to a DC output which is either higher, lower, or alternately both, or inverted in voltage value. Charge pumps can be regulated using a number of schemes, and they can include options, such as extreme condition detection and circuit shut-down capability, which adds to their versatility and commercial acceptance.

On initial consideration, the charge pump seems to be a perfect solution to many power conversion needs. But unfortunately that is not the case. Contrary to a somewhat popular belief, charge pumps are not particularly efficient at power conversion, and they are especially not so when used for supplying varying loads. This can severely limit their use with battery and other limited power sources where power must be used efficiently. Further, even when power availability is not a concern, the use of charge pumps can be limited because inefficiency is ultimately manifested as heat which must be dissipated. Still further, since charge pumps are inherently oscillator based systems, unacceptable "artifacts" such as output voltage ripple and electromagnetic radiation can be present from the conversion process they use. Charge pumps can be implemented using integrated circuits (ICs), but the number, size, and types of external components used may then be areas of concern. This is particularly the case for capacitors used with charge pumps, where any capacitance value and physical size reduction is usually highly desirable.

This discussion now turns to some specific charge pump examples. To avoid confusion, the following will generally be limited to coverage of charge pumps which increase voltage, i.e. step-up charge pumps. However, as skilled practitioners of the electronic arts should readily appreciate, these principles are easily extended to other types of charge pumps as well, such as voltage inverting and step-down types.

FIG. 1 (prior art) is a block diagram of a charge pump circuit employing an IC (specifically, the current version of part MAX682 by Maxim Integrated Products of Sunnyvale, Calif.). Input power is supplied across an input capacitor (C-IN) to appropriate terminals of the IC device. A flying capacitor (C-X) (often also called a transfer capacitor) is connected to other IC terminals (CXP and CXN) to operate in concert with the IC's internal components, discussed presently. Output power is then produced by the IC across an output capacitor (C-OUT). Other components may be present for optional features.

FIG. 2 (prior art) is a functional block diagram of the IC of FIG. 1. Of particular interest are an oscillator (OSC), switches which control power flow to the terminals (CXP and CXN) for the external flying capacitor, and control logic and sensing and tailoring elements used for signals to that control logic.

FIG. 3 (prior art) is a block diagram of an unregulated voltage doubler, i.e. a very simple charge pump. The oscillator (OSC) is free running and the charge and discharge paths to the flying capacitor (C-X) are merely switched (via S1 and S2). Actually, FIG. 3 depicts a simplistic switching scheme, and FIG. 4 depicts a more common case using four switches S1, S2, S3, and S4). The input capacitor (C-IN) and the output capacitor (C-OUT) respectfully act as input and output reservoirs, smoothing out fluctuations as conversion proceeds (e.g., ripple). Unless the output is overloaded, the output voltage (V-OUT) from the circuit in FIG. 3 is almost double the input voltage (V-IN). A voltage doubler is too inflexible for use in most applications, and most charge pumps today employ one of two common regulation schemes to permit adjustment of the output voltage to either a value at initial circuit design or to one which a user can pick by using appropriate components later. Modem IC based systems, such as that in FIG. 1, can often be configured to use either of these common regulation schemes.

FIG. 5 (prior art) is a block diagram illustrating a skip mode charge pump regulation scheme being used to increase or "step-up" the voltage. Each cycle of the oscillator (OSC) results in the output voltage (V-OUT) being increased as the charge in the flying capacitor (C-X), which can be termed a "quanta," is "stacked" onto the output capacitor (C-OUT). The flying capacitor (C-X) is chosen to have a lower capacitance than the output capacitor (C-OUT) so that the output voltage (V-OUT) is increased a small amount during each oscillator cycle. Regulation is accomplished in this scheme by enabling the oscillator with feedback from the output (V-OUT). A sample is taken from resistors (R1 and R2) forming a voltage divider across the circuit's output. This sample from the feedback is compared to the voltage from a reference (REF) with a comparator (COMP). When the output voltage (V-OUT) is determined in this manner to be below a desired value the oscillator operates the switches (S1 and S2) to charge the flying capacitor (C-X) from the input with a new quanta during a first half-cycle and to transfer that quanta to the output during the next half-cycle. When the output voltage (V-OUT) increases to the desired level the oscillator (OSC) is turned off, i.e., dis-enabled. As the output voltage drops, due to power use by the ultimate load (not shown), the oscillator is re-enabled and additional quanta are transferred.

Skip mode regulation is simple but it has some disadvantages. Voltage ripple in the output can be high, and this can be very difficult to filter out because of the varying frequency as the oscillator "skips." The values needed for the external component can also be large, and for the capacitors this particularly means that they may be more sizable and expensive than desired. For this mode of regulation the ratio for values between the flying capacitor and the output capacitor is typically about 1:20. The MAX682 component provides an example. This widely used IC can step-up a 3.3 volt input to a regulated 5.0 volt output for loads up to 250 milli amps (mA). Configured for skip mode, the output voltage ripple rating is 100 milli volts (mV) and the recommended capacitor values are: 2.2 micro farads (uF) for the input capacitor (C-IN), 1 uF for the flying capacitor (C-X), and 10 uF for a ceramic type output capacitor. In view of the large output capacitance needed, a tantalum type may be preferable, and then a 47 uF unit is recommended.

FIG. 6 (prior art) is a block diagram illustrating a constant-frequency mode charge pump regulation scheme. Here the oscillator is allowed to free run, i.e., to run at a constant frequency, and feedback from the output (V-OUT) is instead here used to control a variable resistance device (N-CHANNEL) in the charge path of the flying capacitor (C-X). Due to the resistance of this resistance device, the flying capacitor is not able to fully charge within an oscillator half-cycle, and thus the size of each quanta of power transferred is regulated. In actual practice the variable resistance device is typically combined with the switches (S1 and S2), using appropriate transistors to perform both functions.

Constant frequency mode has a number of advantages over skip mode regulation. Voltage ripple in the output is lower and, if necessary, it can be filtered out more easily because it has a fixed frequency. The external component values can also be much smaller. In constant frequency mode the ratio of the flying capacitor to the output capacitor is typically only about 1:4. Continuing with the MAX682 as an example, when this IC is configured for constant frequency mode its rated output voltage ripple is only 80 mV and the recommended capacitor values are: 1 uF for the input capacitor (C-IN), 0.47 uF for the flying capacitor (C-X), and 2.2 uF for a ceramic output capacitor.

However, even constant frequency mode also has some disadvantages. When an output load is small or non-existent the oscillator is still running, switching at a high, constant frequency and consuming a substantial quiescent current. The term "substantial" is, of course, relative. But for many applications any unnecessary use of current is a severe disadvantage. Battery powered applications suffer particularly, but even for line powered applications such energy waste is often undesirable.

Accordingly, what is needed is a new scheme for regulating charge pumps, one which optimally combines the advantages, but not the disadvantages, of existing skip mode and constant frequency mode regulation schemes.

DISCLOSURE OF INVENTION

Accordingly, it is an object of the present invention to provide charge pump regulation which is efficient at all appropriate loads.

Another object of the invention is to provide charge pump regulation which remains efficient as load is dynamically varied.

Another object of the invention is to provide charge pump regulation which employs components, particularly including capacitors, having small values.

And another object of the invention is to provide charge pump regulation which produces low output voltage ripple.

Briefly, one preferred embodiment of the present invention is a circuit for regulating a charge pump. The charge pump has an input, output, and common terminals and receives an input signal having an input voltage and produces an output signal having an output voltage. Included in the charge pump are an input capacitor connected across the input and common terminals, an output capacitor connected across the output and common terminals, and a flying capacitor having first and second sides. The inventive regulating system for the charge pump includes an oscillator, a detection sub-circuit, a channel-switch sub-circuit, and an enable sub-circuit. When enabled by an enable signal, the oscillator produces an oscillator signal that alternates between a first state and a second state. The detection sub-circuit produces an error signal when the output voltage is less than a desired output voltage. This error signal has a voltage representative of how much the output voltage differs from said desired output voltage. In embodiments to step up voltage, the channel-switch sub-circuit connects the first side of the flying capacitor to the common terminal when the oscillator signal is in its first state and connects to the input terminal when the oscillator signal is in its second state. The channel-switch sub-circuit further connects the second side of the flying capacitor to the input terminal when the oscillator signal is in its first state and to the output terminal when the oscillator signal is in its second state. Alternate embodiments may employ alternate connection arrangements to achieve step up voltage conversion or voltage inversion, such switching arrangements for flying capacitors being essentially conventional. The channel-switch sub-circuit further controllably sets resistance to the flying capacitor in response to the voltage in the error signal when the oscillator signal is in its first state. The enable sub-circuit produces the enable signal when the error signal has voltage differing from said desired output voltage by a preset amount, for regulating the charge pump by enabling the oscillator to operate the channel-switch sub-circuit to alternately charge the flying capacitor at a rate controlled by the resistance set by said channel-switch sub-circuit and to discharge it via the output terminal into the output capacitor of the charge pump.

An advantage of the present invention is that it provides charge pump regulation having efficiency at light loads which is comparable to that of skip mode regulation, yet also provides efficiency at heavy loads which is comparable to that of constant frequency mode regulation. Furthermore, the invention provides such regulation even while automatically, dynamically adjusting to efficiently accommodate varying load.

Another advantage of the invention is that it may be implemented with capacitors having relatively low values, which are accordingly physically smaller and cheaper, and in some cases also may be of more preferable alternate types.

And other advantages of the invention are that it provides regulation which produces low output voltage ripple and low radiation emission, thus minimizing any undesired effects of such on associated loads or proximate other circuitry.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
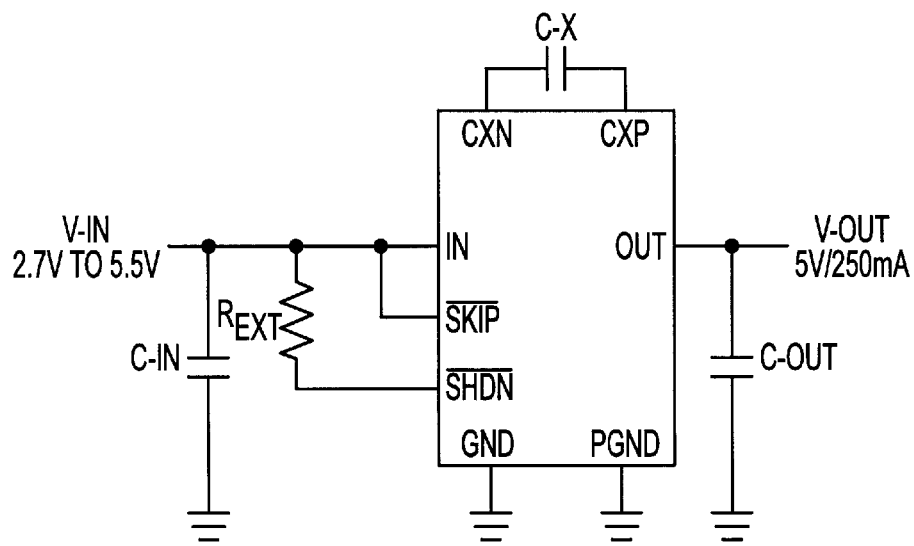
FIG. 1 (prior art) is a block diagram of a typical regulated charge pump circuit employing an integrated circuit which is a suitable candidate for use of the invention.
Figure 2:
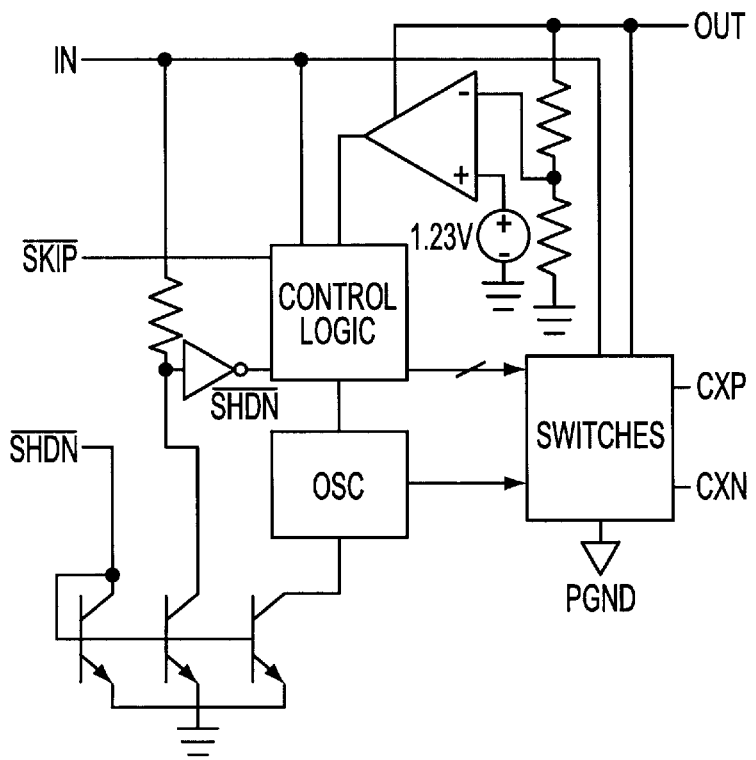
FIG. 2 (prior art) is a functional block diagram of the integrated circuit of FIG. 1.

A preferred embodiment of the present invention is a system for regulating a charge pump. As illustrated in the various drawings herein, and particularly in the view of FIG. 7, a form of this preferred embodiment of the invention is depicted by the general reference character 10.

Figure 7:
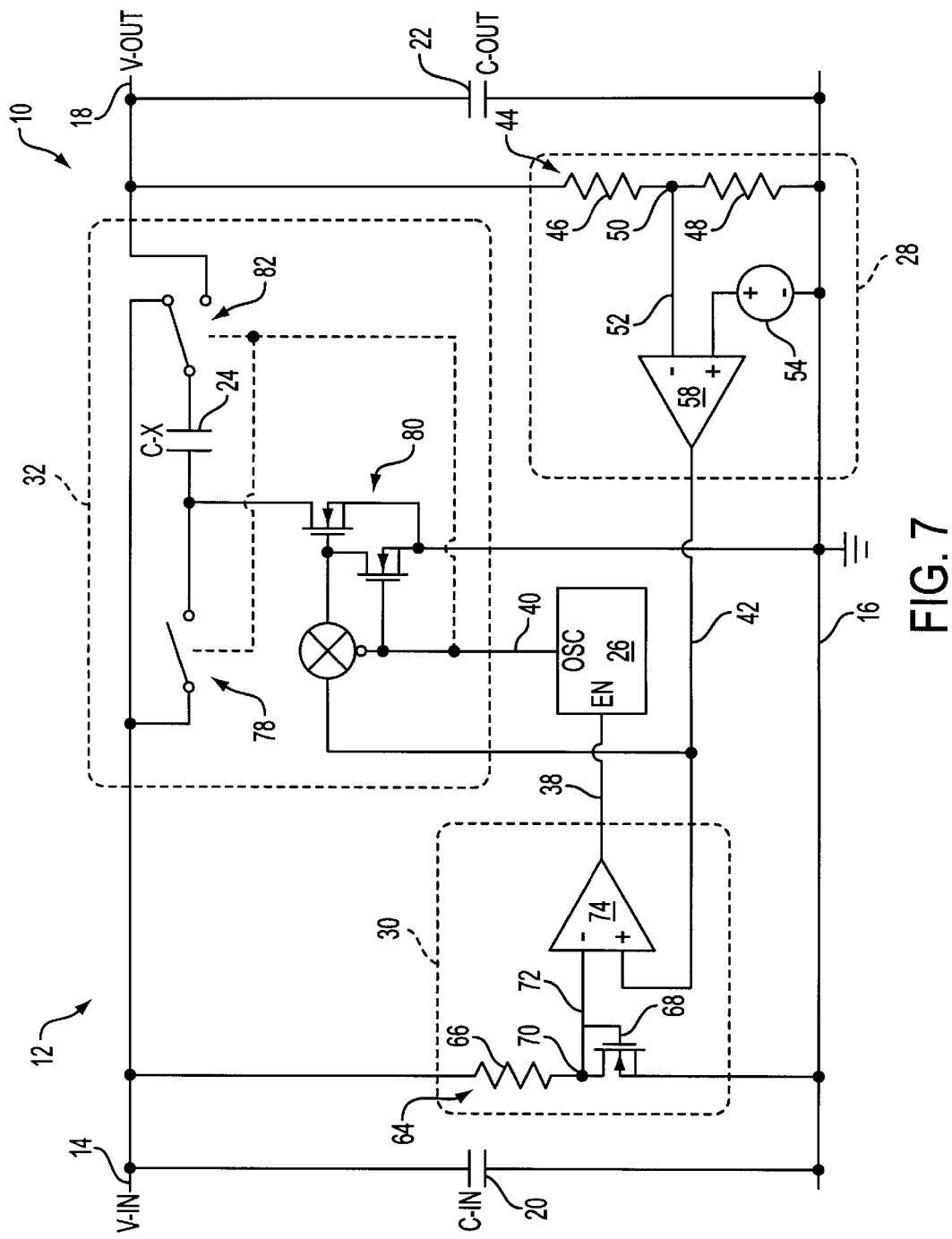
FIG. 7 is a block diagram illustrating a preferred embodiment of the present invention.

FIG. 7 is a block diagram illustrating a preferred embodiment of the inventive regulating system 10 in a charge pump 12. A suitable DC input voltage (V-IN) is applied across an input terminal 14 and a common terminal 16, and a regulated output voltage (V-OUT) is produced across an output terminal 18 and the common terminal 16. For use as an input reservoir an input capacitor 20 is connected across the input terminal 14 and the common terminal 16, and for use as an output reservoir an output capacitor 22 is connected across the output terminal 18 and the common terminal 16. (The input capacitor 20 is theoretically optional, but in practice one is almost always used, and the circuit input always has some intrinsic capacitance, anyway.) For providing the distinctive capability of a charge pump, a flying capacitor 24 and an oscillator 26 are included. For controlling and particularly regulating the charge pump 12 in the manner of the invention a detection sub-circuit 28, an enable sub-circuit 30, and a switching sub-circuit 32 are also provided.

The oscillator 26 used is an enabled type, but otherwise may be essentially the same as typically used in prior art systems. The oscillator 26 requires an enable signal 38 and it produces an oscillator signal 40 which alternates between two states at roughly a 50% duty cycle.

The detection sub-circuit 28 provides an error signal 42 which includes a characteristic that is representative of how much the desired output and the actual output voltage differ at the output terminal 18 of the charge pump 12. This is also much as in prior art charge pumps, and essentially similar components can be used. However, as will be discussed in more detail, below, the error signal 42 produced by the inventive regulating system 10 is used much differently.

In the embodiment illustrated in FIG. 7, the detection sub-circuit 28 includes a voltage divider network 44 formed by a first resistor 46 which is series connected with a second resistor 48 at a feedback node 50. This divider network 44 is connected across the output terminal 18 and the common terminal 16 of the charge pump 12. For example, if the first resistor 46 is nominally 30 kilo ohms (kΩ) and the second resistor 48 is nominally 10 kΩ, a quarter of the actual output voltage of the charge pump 12 is provided as a feedback signal 52 from the feedback node 50. A voltage reference 54 is further provided to supply a reference signal 56. A 1.23 volt bandgap device may be used as the voltage reference 54. An error amplifier 58, say one providing a gain of 20×, receives both the feedback signal 52 and the reference signal 56, as its inputs, and from them creates the error signal 42.

The enable sub-circuit 30 provides the enable signal 38 to the oscillator 26. While one method of prior art charge pump regulation (skip mode) does use enabled oscillation, as contrasted with free running oscillation, and thus does employ an enable signal, the circuitry used here and particularly when this enable signal 38 is actually produced are key distinctions of the inventive regulating system 10 over the prior art.

In the embodiment illustrated in FIG. 7, the enable sub-circuit 30 includes a replica branch 64 formed by a resistor 66 which is series connected with a replica device 68 at a replica node 70. The replica branch 64 is connected across the input terminal 14 and the common terminal 16, and produces a threshold signal 72 from the replica node 70. The "threshold" here is representative of the minimum efficient energy quanta for operation of the charge pump 12. The nature and purpose of the threshold signal 72 produced here are discussed further below. The "replica" here is a characteristic which we want to replicate. Since the switching sub-circuit 32 will typically employ transistors, the replica device 68 used here is a suitable diode connected device for replicating junction characteristics in the switching sub-circuit 32. Replica transistors and diode connection are conventional arts, and general discussion of such is therefore not appropriate here.

Those skilled in the electronics arts will readily appreciate that it is the ratios of components which can be controlled precisely and which are therefore important; precise actual values are usually difficult to obtain in integrated circuit embodiments. Thus replica principles are useful and actual values for components such as the first resistor 46 and the second resistor 48 are not important, as contrasted to their ratio, which is.

Figure 8:
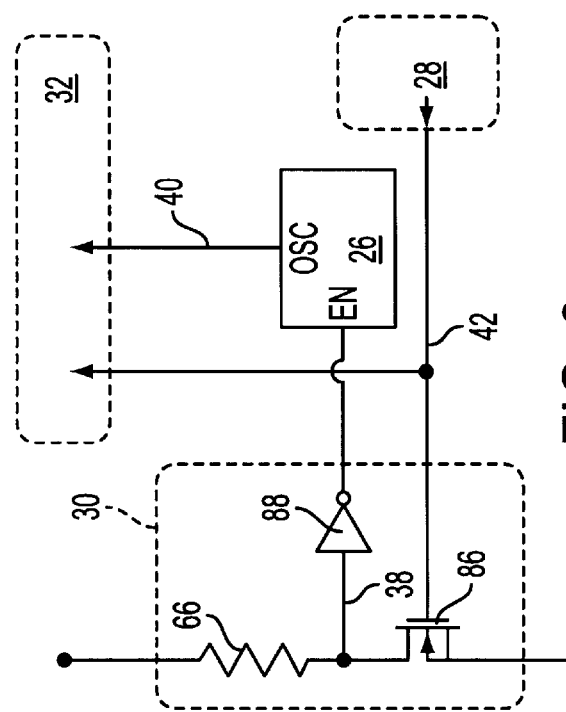
FIG. 8 is a block diagram illustrating an alternate enable sub-circuit for the embodiment of FIG. 7.

In FIG. 7 the replica device 68 is an n-channel MOSFET transistor with its gate directly connected to its source. An enable amplifier 74, say one providing a 100× gain, receives both the error signal 42 and the threshold signal 72, and creates from these inputs the enable signal 38. Departing from FIG. 7 briefly, FIG. 8 is a block diagram of an alternate enable sub-circuit 30, depicting implementation in a physically simpler manner. As can be seen in FIG. 8, the replica device and the enable amplifier may be combined in some implementations, particularly in integrated circuits, but FIG. 7 better conceptually depicts the key aspects of operation of the regulating system 10.

Figure 3:
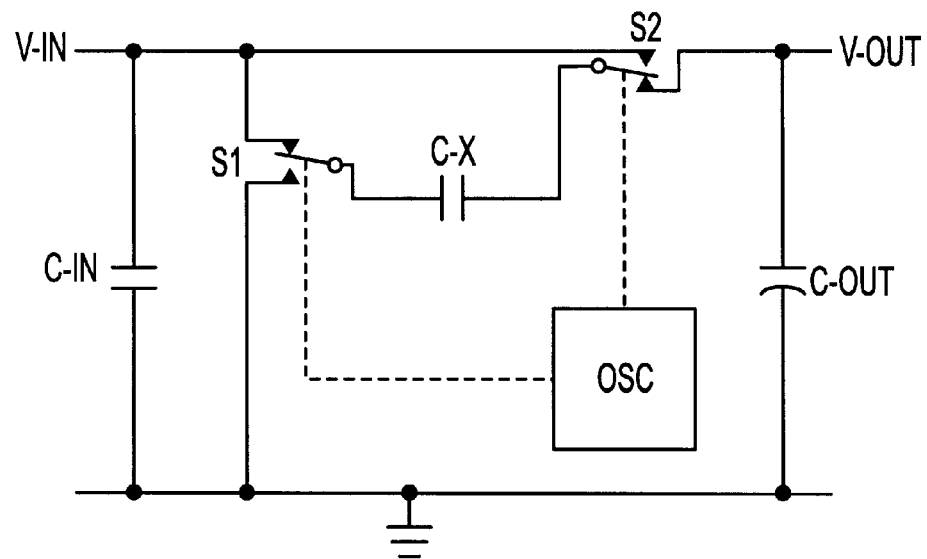
FIG. 3 (prior art) is a block diagram of an unregulated voltage doubler.

The switching sub-circuit 32 performs two concurrent functions. First, responsive to the oscillator signal 40, it switches the flying capacitor 24 alternately to the input terminal 14 and the output terminal 18 of the charge pump 12. Second, responsive to the error signal 42, it controls the series resistance of the charge path to the flying capacitor 24. The first function, switching, is essentially the same as that of oscillator switching sub-circuits used in all charge pumps, see e.g., FIG. 3–5 (prior art). The second function, resistance control, is conceptually similar to what occurs in constant frequency mode regulation, see e.g., FIG. 5. However, the manner of controlling the charging rate of the flying capacitor 24 in the charge pump 12 is different here. This is also discussed further below.

Figure 4:
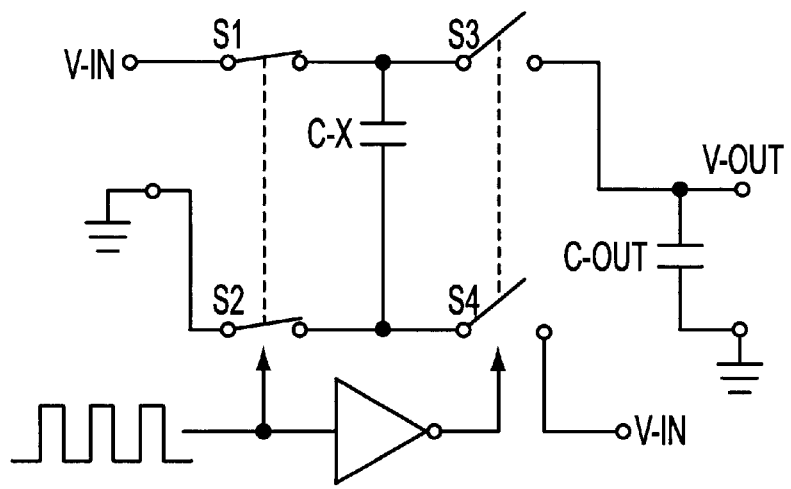
FIG. 4 (prior art) is a block diagram illustrating in more detail a flying capacitor switching scheme more typically used in implementations such as that of FIG. 3.
Figure 5:
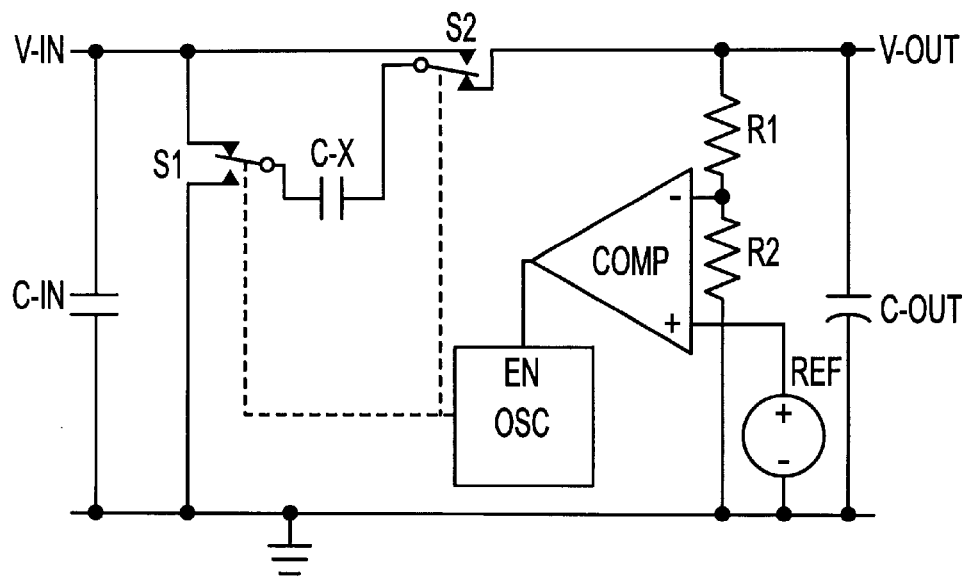
FIG. 5 (prior art) is a block diagram illustrating a skip mode charge pump regulation scheme.
Figure 6:
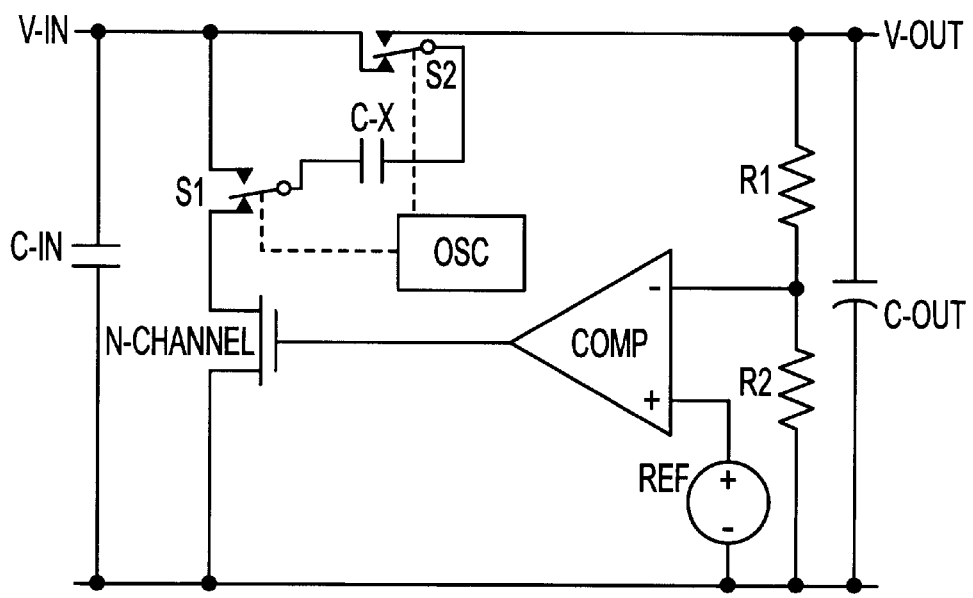
FIG. 6 (prior art) is a block diagram illustrating a constant-frequency mode charge pump regulation scheme.

In the embodiment illustrated in FIG. 7, the switching sub-circuit 32 includes a first switch 78, a channel unit 80, and a second switch 82 (depicted to emphasize conceptual operation; as previously noted with respect to FIG. 4 (prior art) and as should be readily appreciated by those skilled in the electronic arts, various embodiments are possible based on particular characteristics of the materials used, e.g., integrated circuit semiconductor material or electrolytic capacitor nature). The oscillator signal 40 operates these components in switch-like manner, and the error signal 42 further operates the channel unit 80 in a variable resistance-like manner.

In such operation, when a heavy load (not shown) is connected across the output terminal 18 and the common terminal 16 of the charge pump 12 the inventive regulating system 10 performs much as prior art charge pumps do. The oscillator 26 is enabled and runs continuously to operate the first switch 78, the channel unit 80, and the second switch 82 in the manner of switches. Concurrently, the error signal 42 is present and due to the heavy load is of sufficient magnitude that the channel unit 80 is directed to apply minimum resistance in the charging path to the flying capacitor 24. Accordingly, continuous, maximum sized quanta of energy are transferred from the input to the output of the charge pump 12.

In contrast, when a light load is present at the output the inventive regulating system 10 operates the charge pump 12 much differently. As the output load (I-OUT) gets smaller and smaller, say once the load is reduced (start up situations initially appear as a "heavy" load), the output voltage (V-OUT) gets higher and higher. At some point in this scenario the error signal 42 becomes less than the threshold signal 72, and the enable amplifier 74 ceases producing the enable signal 38. The output voltage is then held without any charge being distributed to the output capacitor 22 until such time as the load on the output (or the very small current through the divider network 44) draws the output voltage down again. Eventually this happens and the error signal 42 is once again produced. However, since the load is light the discrepancy between the actual and desired output voltages is initially quite small, and the error signal 42 initially has too small a magnitude to cause the enable signal 38 to immediately be produced, i.e., it is still less than the threshold signal 72. Thus the oscillator 26 is not quite yet enabled. But the continuing draw of the load on the reservoir in the output capacitor 22 at some point does soon cause the error signal 42 to exceed the threshold signal 72, and the enable signal 38 is then produced. The oscillator 26 then cycles once. But only once in this light load scenario, because the quanta transferred into the output capacitor 22 in this single cycle is enough to cause the output voltage to increase enough that the error signal 42 either again ceases or its magnitude drops again below that of the threshold signal 72. Thus the first function of the switching sub-circuit 32 has occurred.

The second function of the switching sub-circuit 32 occurs concurrently. During the single cycle noted above, the magnitude of the error signal 42 controls the channel unit 80 such that the charge path to the flying capacitor 24 has a high resistance. Therefore the quanta transferred into the output capacitor 22 here is appropriately small.

The above process can be summarized by analogy to maintaining the level in a swimming pool when one has to carry water to the pool in a bucket. On some days evaporation will be high, i.e., high load, and a lot of water will need to be added. And on other days evaporation will be low, i.e., low load. Carrying whole buckets of water works well when there is high evaporation, and when there is low evaporation one can wait until a whole bucket is needed. This is skip mode regulation. Quiescent load is low, i.e., one has to make few trips to and from the water source. In contrast, one can constantly run back and forth between the pool and the water source, taking buckets full when the load is high and mere drops of water in the bucket when the load is light. This is constant frequency mode regulation. Quiescent load is high, i.e., one is constantly making trips, regardless of whether much water is needed. What is needed is a more controlled approach, one adding sensing at the pool of when a predetermined, efficient minimum quanta of water is needed.

Returning now to discussion of the inventive regulating system 10 for charge pumps, the voltage of the threshold signal 72 (FIG. 7) is ideally some threshold voltage plus a small voltage determined to be the right amount to set a pulse skipping threshold. While the replica network 64 described above is the inventor's presently preferred approach to accomplish this, others means may be used. The goal is any mechanism that minimizes the amount of energy expended to transfer the flying capacitor energy over to the output. Techniques other than just the modulated resistance approach of FIG. 7 are therefore possible.

FIG. 8 is a block diagram illustrating one suitable substitute for the enable sub-circuit 30 of the embodiment in FIG. 7. As can be appreciated there, the enable amplifier 74 of FIG. 7 can be eliminated by using a transistor 86 and an inverter 88.

Figure 9:
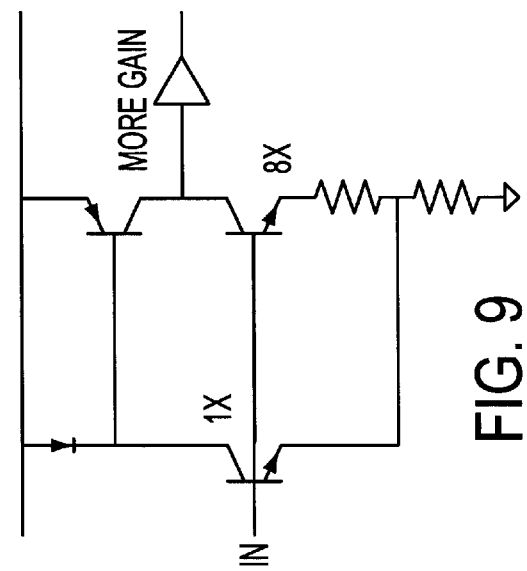
FIG. 9 is a block diagram illustrating an alternate detection sub-circuit for the embodiment of FIG. 7.

FIG. 9 is a block diagram illustrating one suitable substitute for the detection subcircuit 28 of the embodiment in FIG. 7. Detecting when a voltage deviates from its desired value can be accomplished in many ways, and many substitutes for the detection sub-circuit 28 are therefore possible.

In the Background Art section it was noted that charge pumps can convert input voltages to output voltages which are either higher, lower, alternately both, or inverted in voltage value. FIG. 7 depicts a "boost" embodiment, one which produces a higher output voltage. Once the principle of the inventive regulating system 10 is appreciated, it may be applied as well to "buck" embodiments (for producing a lower output voltage) and also to embodiments producing an inverted output voltage. Alternately producing boost or buck requires determining which is desired and then merely switching an appropriate embodiment accordingly.

In addition to the above mentioned examples, various other modifications and alterations of the inventive regulating system 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The present regulating system 10 is well suited for application in a wide variety of charge pump applications. While the above discussion has focused on charge pumps suitable for stepping up an input voltage to a desired output voltage, the regulating system 10 may also be used for stepping down an input voltage, either to a voltage having the same polarity or to a voltage having inverted polarity.

The regulating system 10 provides particular benefits over existing charge pump regulating schemes. It operates efficiently yet automatically across a range from light to maximum loads. When supplying heavy and maximum loads, it has efficiency equal to that of conventional constant frequency mode regulation. Yet when supplying light loads, it operates with efficiency equal to conventional skip mode regulation. And unlike these conventional modes, which cannot be dynamically switched between during operation because external components must be changed, the present regulating system 10 automatically adapts to the load which is actually present.

Furthermore, the regulating system 10 can employ more desirable electrical components. This is so with respect to the physical size, type, cost and yet other factors which motivate component selection. For example, to step-up a 3.3 volt input to a 5.0 volt output with conventional skip mode regulation a charge pump would typically require a 2.2 uF input capacitor, a 1 uF flying capacitor, and a 10 uF ceramic type output capacitor (for which a 47 uF tantalum type might well have to be substituted). In contrast, achieving the same voltage conversion with conventional constant frequency mode regulation typically would require only a 1 uF input capacitor, a 0.47 uF flying capacitor, and a 2.2 uF ceramic output capacitor (likely avoiding the expense and other problems associated with tantalum capacitors, such as voltage ripple due to high equivalent series resistance). The smaller value components may also provide direct cost savings and indirect savings as well, such as use of less circuit board space. Obviously, using components sized for conventional constant frequency mode regulation is preferable. The inventive regulating system 10 can use such components, yet not suffer from the performance limitations of the prior art regulation schemes.

For the above, and other, reasons, it is expected that the regulating system 10 of the present invention will have widespread industrial applicability, and it is therefore expected that the commercial utility of the present invention will be extensive and long lasting.

PULSE FREQUENCY OPERATION OF REGULATED CHARGE PUMPS Inventor: THURBER Jr., Charles R. Atty. ref.: MAX1P048

THIS CORRESPONDENCE CHART IS FOR EASE OF UNDERSTANDING AND INFORMATIONAL PURPOSES ONLY, AND DOES NOT FORM A PART OF THE FORMAL PATENT APPLICATIONS.

| 10 | regulating system |
| 12 | charge pump |
| 14 | input terminal |
| 16 | common terminal |
| 18 | output terminal |
| 20 | input capacitor |
| 22 | output capacitor |
| 24 | flying capacitor |
| 26 | oscillator |
| 28 | detection sub-circuit |
| 30 | enable sub-circuit |
| 32 | switching sub-circuit |
| 38 | enable signal |
| 40 | oscillator signal |
| 42 | error signal |
| 44 | divider network |
| 46 | first resistor |

-continued

| 48 | second resistor |
| 50 | feedback node |
| 52 | feedback signal |
| 54 | voltage reference |
| 56 | reference signal |
| 58 | error amplifier |
| 64 | replica branch |
| 66 | resistor |
| 68 | replica device |
| 70 | replica node |
| 72 | threshold signal |
| 74 | enable amplifier |
| 78 | first switch |
| 80 | channel unit |
| 82 | second switch |
| 86 | transistor |
| 88 | inverter |

What is claimed is:

1. A circuit for regulating a charge pump receiving an input signal across an input terminal and a common terminal and producing an output signal across an output terminal and the common terminal, wherein the input signal has an input voltage and the output signal has an output voltage and the charge pump includes an input capacitor connected across the input terminal and the common terminal, and an output capacitor connected across the output terminal and the common terminal, and a flying capacitor having a first side and a second side, the circuit comprising:

an oscillator which, when enabled by an enable signal, produces an oscillator signal that alternates between a first state and a second state;

a detection sub-circuit producing an error signal when the output voltage deviates from a desired output voltage, wherein said error signal has voltage representative of how much the output voltage differs from said desired output voltage;

a channel-switch sub-circuit suitable for connecting the flying capacitor across the common terminal and the input terminal when said oscillator signal is in said first state, and alternately connecting the flying capacitor across the common terminal and the output terminal when said oscillator signal is in said second state;

said channel-switch sub-circuit further suitable for controllably setting resistance to the flying capacitor responsive to voltage in said error signal when said oscillator signal is in said first state; and an enable sub-circuit producing said enable signal when said error signal has voltage exceeding said desired output voltage by a preset amount, for regulating the charge pump by enabling said oscillator to operate said channel-switch sub-circuit to alternately charge the flying capacitor at a rate controlled by resistance set by said channel-switch sub-circuit from the input terminal and to discharge the flying capacitor via the output terminal into the output capacitor.

2. The circuit of claim 1, wherein said detection sub-circuit includes:

a reference unit suitable for producing a reference signal having said desired output voltage; and an error comparator suitable for producing said error signal when said output voltage differs from said desired output voltage.

3. The circuit of claim 1, wherein said detection sub-circuit includes:

a voltage divider connected across said output terminal and said common terminal, wherein said voltage divider produces a feedback signal having voltage related to the output voltage;

a reference unit suitable for producing a reference signal having voltage related to said desired output voltage; and an error comparator suitable for producing said error signal when a relationship between said feedback signal and said reference signal indicates that the output voltage differs from said desired output voltage.

4. The circuit of claim 1, wherein:

said channel-switch sub-circuit connects the first side of the flying capacitor to the common terminal and the second side of the flying capacitor to the input terminal when said oscillator signal is in said first state; and said channel-switch sub-circuit alternately connects the first side of the flying capacitor to the input terminal and the second side of the flying capacitor to the output terminal when said oscillator signal is in said second state, to operate the charge pump such that the output voltage produced is of same polarity and of higher value than the input voltage received by the charge pump.

5. The circuit of claim 1, wherein:

said channel-switch sub-circuit connects the first side of the flying capacitor to the common terminal and the second side of the flying capacitor to the input terminal when said oscillator signal is in said first state; and said channel-switch sub-circuit alternately connects the first side of the flying capacitor to the output terminal and the second side of the flying capacitor to the common terminal when said oscillator signal is in said second state, to operate the charge pump such that the output voltage produced is of opposite polarity and of lower value than the input voltage received by the charge pump.

6. The circuit of claim 1, wherein:

the first side of the flying capacitor is connected to the common terminal;

said channel-switch sub-circuit connects the second side of the flying capacitor to the input terminal when said oscillator signal is in said first state; and said channel-switch sub-circuit alternately connects the second side of the flying capacitor to the output terminal when said oscillator signal is in said second state, to operate the charge pump such that the output voltage produced is of same polarity and of lower value than the input voltage received by the charge pump.

7. The regulated charge pump of claim 1, wherein said enable sub-circuit includes:

a resistance series connected with a replica device at a node and together connected across the input terminal and the common terminal such that a threshold signal is produced at said node; and an enable comparator suitable for producing said enable signal when voltage in said error signal is greater than voltage in said threshold signal.

8. The circuit of claim 5, wherein said replica unit is a diode connected device.

9. The circuit of claim 6, wherein said diode connected device is a MOSFET transistor with gate and drain connected together.

10. The circuit of claim 1, wherein said channel sub-circuit includes at least one n-channel MOSFET transistor.

11. The circuit of claim 1, wherein said switch sub-circuit is a plurality of transistors operating in a double pole single throw manner.

12. A method for regulating a charge pump receiving an input signal having an input voltage and producing an output signal having an output voltage, wherein the charge pump is of the type having an input capacitor connected across an input terminal and a common terminal, an output capacitor connected across an output terminal and the common terminal, and a flying capacitor having a first side and a second side, the method comprising the steps of:

(a) producing an error signal when the output voltage of the charge pump deviates from a desired output voltage;

(b) comparing said error signal with a desired enable threshold to produce an enable signal when said error signal exceeds said desired enable threshold;

(c) enabling an oscillator, responsive to presence of said enable signal, to produce an oscillator signal alternating between a first state and a second state;

(d) charging the flying capacitor from the input terminal of the charge pump when said oscillator signal is in said first state and discharging the flying capacitor into the output capacitor when said oscillator signal is in said second state;

(e) setting a resistance, responsive to magnitude of said error signal, controlling at what rate the flying capacitor charges and discharges, thereby regulating the charge pump.

13. The method of regulating of claim 12, wherein said step (a) includes:

producing a feedback signal having voltage related to the output voltage;

producing a reference signal having voltage related to said desired output voltage; and comparing said feedback signal to said reference signal, to produce said error signal when the output voltage is less than said desired output voltage.

14. The method of regulating of claim 12, wherein said step (b) includes:

producing a threshold signal having magnitude representative of a minimum level for efficient operation of the charge pump; and comparing said threshold signal to said error signal, to produce said enable signal when said error signal exceeds said desired enable threshold.

15. The method of regulating of claim 12, wherein said step (d) includes:

switching connection of the first side of the flying capacitor to the common terminal and the second side of the flying capacitor to the input terminal when said oscillator signal is in said first state, to charge the flying capacitor; and switching connection of the first side of the flying capacitor to the input terminal and the second side of the flying capacitor to the output terminal when said oscillator signal is in said second state, to discharge the flying capacitor such that the charge pump operates to produce the output voltage of same polarity and of higher value than the input voltage received by the charge pump.

16. The method of regulating of claim 12, wherein said step (d) includes:

switching connection of the first side of the flying capacitor to the common terminal and the second side of the flying capacitor to the input terminal when said oscillator signal is in said first state, to charge the flying capacitor; and switching connection of the first side of the flying capacitor to the output terminal and the second side of the flying capacitor to the common terminal when said oscillator signal is in said second state, to discharge the flying capacitor such that the charge pump operates to produce the output voltage of opposite polarity and of lower value than the input voltage received by the charge pump.

17. The method of regulating of claim 12, wherein said step (d) includes:

connecting the first side of the flying capacitor to the common terminal;

switching connection of the second side of the flying capacitor to the input terminal when said oscillator signal is in said first state, to charge the flying capacitor; and switching connection of the second side of the flying capacitor to the output terminal when said oscillator signal is in said second state, to discharge the flying capacitor such that the charge pump operates to produce the output voltage of same polarity and of lower value than the input voltage received by the charge pump.

18. The method of regulating of claim 12, wherein said step (d) includes:

determining whether the input voltage is lower or higher than said desired output voltage;

if the input voltage is lower than said desired output voltage, then:

switching connection of the first side of the flying capacitor to the common terminal and the second side of the flying capacitor to the input terminal when said oscillator signal is in said first state, to charge the flying capacitor; and switching connection of the second side of the flying capacitor to the output terminal when said oscillator signal is in said second state, to discharge the flying capacitor such that the charge pump operates to produce the output voltage of same polarity and of lower value than the input voltage received by the charge pump; and if the input voltage is higher than said desired output voltage, then:

switching connection of the first side of the flying capacitor to the common terminal and the second side of the flying capacitor to the input terminal when said oscillator signal is in said first state, to charge the flying capacitor; and switching connection of the first side of the flying capacitor to the input terminal and the second side of the flying capacitor to the output terminal when said oscillator signal is in said second state, to discharge the flying capacitor such that the charge pump operates to produce the output voltage of same polarity and of higher value than the input voltage received by the charge pump.

19. The method of regulating of claim 12, wherein said step (e) includes setting said resistance by controllably biasing at least one transistor to control charging current to the flying capacitor.

20. The method of regulating of claim 19, wherein at least one said transistor is of an n-channel MOSFET type.

* * * * *